United States Patent [19]
Sato et al.

[11] Patent Number: 5,584,171
[45] Date of Patent: Dec. 17, 1996

[54] GAS TURBINE CONTROL METHOD AND APPARATUS

[75] Inventors: Isao Sato; Fumiyuki Hirose; Minoru Takaba; Akira Shimura; Shoei Takahashi, all of Hitachi; Hiraku Ikeda, Hitachinaka, all of Japan

[73] Assignee: Hitachi, Ltd., Tokyo, Japan

[21] Appl. No.: 365,439

[22] Filed: Dec. 28, 1994

[30] Foreign Application Priority Data

Dec. 28, 1993 [JP] Japan .................................. 5-334900

[51] Int. Cl.⁶ .................................................. F02C 9/50
[52] U.S. Cl. ........................................ 60/39.03; 60/39.27
[58] Field of Search ........................... 60/39.03, 39.27, 60/39.281

[56] References Cited

U.S. PATENT DOCUMENTS

| | | | |
|---|---|---|---|
| 4,178,754 | 12/1979 | Earnest | 60/39.27 |
| 4,299,088 | 11/1981 | Rowen et al. | 60/39.27 |
| 4,529,887 | 7/1985 | Johnson . | |
| 4,550,565 | 11/1985 | Ozono et al. | 60/39.27 |

*Primary Examiner*—Louis J. Casaregola
*Attorney, Agent, or Firm*—Evenson, McKeown, Edwards & Lenahan, P.L.L.C.

[57] ABSTRACT

A gas turbine engine control method and apparatus as disclosed for optimizing fuel/air mixture, especially during decreasing load conditions. In a large capacity gas turbine engine system used for generation of electric power, the system is designed to operate at a relatively constant rotational speed of the turbine which drives an electric generator unit. The load of the turbine engine varies throughout the day due to changes in electrical power demands. During normal rated load conditions, the control of the fuel/air mixture is by way of changes in fuel supply, corrected to return the turbine exhaust temperature to a desired rated temperature. During this mode of operation, the compressor inlet guide vanes are maintained in a substantially constant open position. For accommodating decreasing load conditions where the temperature drops below a predetermined temperature level below the rated temperature operation, the system is switched to an inlet guide vane control mode of operation. During the guide vane control mode of operation, the inlet guide vanes are controlled at a more precise temperature correction sensitivity than is the case for normal load operations. This more precise inlet guide vane control during decreasing load conditions assures improved fuel/air mixture during decreasing load and consequent improved efficiency and minimal $NO_x$ compound emissions, especially during changing ambient temperature conditions where cold air would otherwise increase the air supply.

42 Claims, 4 Drawing Sheets

GAS TURBINE CONTROL METHOD AND APPARATUS

BACKGROUND AND SUMMARY OF THE INVENTION

The invention relates to a gas turbine engine control method and apparatus. More specifically, the invention relates to an improved system for controlling the fuel/air mixture supplied through a combustion chamber of a gas turbine.

In large capacity gas turbine engine systems, such as used for generation of electric power, a gas turbine engine is designed to operate at a relatively constant rotational speed of the turbine which drives an electric generator unit. The load on the turbine engine varies throughout the day due to changes in electrical power demands. For maximum efficiency and minimum emission of $NO_x$ compounds, it is desired to maintain optimum fuel to air ratio mixtures supplied to the combustion chamber over all operating ranges.

U.S. Pat. No. 4,529,887 to Johnson discloses a prior art arrangement of a gas turbine system of the type which the present invention is directed toward improving.

In conventional turbine systems of the type referred to above, the fuel flow rate is controlled by varying the opening of compressor inlet guide vanes in response to load changes on the turbine. During decreases in load on the turbine, the fuel flow rate is decreased and the opening of compressor inlet guide vanes is controlled to be closed to reduce the supply of air. However, problems arise with such systems, especially during decreasing loads, since the closing of the compressor inlet guide vanes lags behind the decrease in the fuel flow supply, leading to an excessive air supply in the fuel-to-air ratio of the mixture supplied to the combustion chamber. The resultant imbalance in the fuel/air ratio supplied to the combustion chamber leads to problems of combustion instability, which affects the emissions and the efficiency of the turbine engine systems.

Also, with prior art arrangements, during low atmospheric temperature conditions in the winter season, for example, the effective air flow rate increases due to its high density. Thus, especially under low atmospheric temperature conditions, even more excessive air is mixed with the fuel during load decreases due to the delayed closing of the compressor inlet guide vanes during such load decreases.

An object of the present invention is to provide a method and apparatus for controlling a gas turbine engine system with high reliability while improving the combustion stability during decreasing load. A further object is to optimize combustion stability throughout changing exterior temperature conditions during, for example, operation in a winter season as compared to a summer season.

These objects are achieved according to the present invention by providing a control method and system which includes different operating control methods during decreasing loads below a predetermined rated load operation range of the gas turbine system. In especially preferred embodiments, during the rated load operation, the inlet guide vanes are in the fully open condition and the combustion fuel air mixture is controlled by regulating only the fuel flow rate as a function of detected turbine exhaust gas temperature changes. During the rated load operation range of the system, adjustments in the fuel supply are made in response to large turbine exhaust temperature deviations from a present desired turbine exhaust gas temperature of, for example, 5° C., with the adjusting of fuel flow made at a relatively fast changing rate corresponding in preferred embodiments to turbine exhaust temperature correcting rate of 1° C./s (1° C./second). This is a so-called "exhaust gas temperature control" mode of operation, hereafter EGT control. During decreasing load operations, when turbine exhaust temperature falls a pre-set amount below a pre-set temperature below a predetermined desired temperature, the control is switched from the EGT control to "compressor inlet guide vane control" (hereafter IGV control) with guide vane opening changes being initiated and implemented at a different changing rate and in response to a lower temperature deviation from the desired turbine exhaust gas temperature than is the case with EGT control. The system of the present invention advantageously assures the proper fuel/air ratio, during load fluctuations, and especially during load reductions, because the IGV control effects a more precise and more timely reduction in combustion air supply than with prior arrangements.

Other objects, advantages and novel features of the present invention will become apparent from the following detailed description of the invention when considered in conjunction with the accompanying drawings.

DETAILED DESCRIPTION OF THE DRAWINGS

Figure 1:
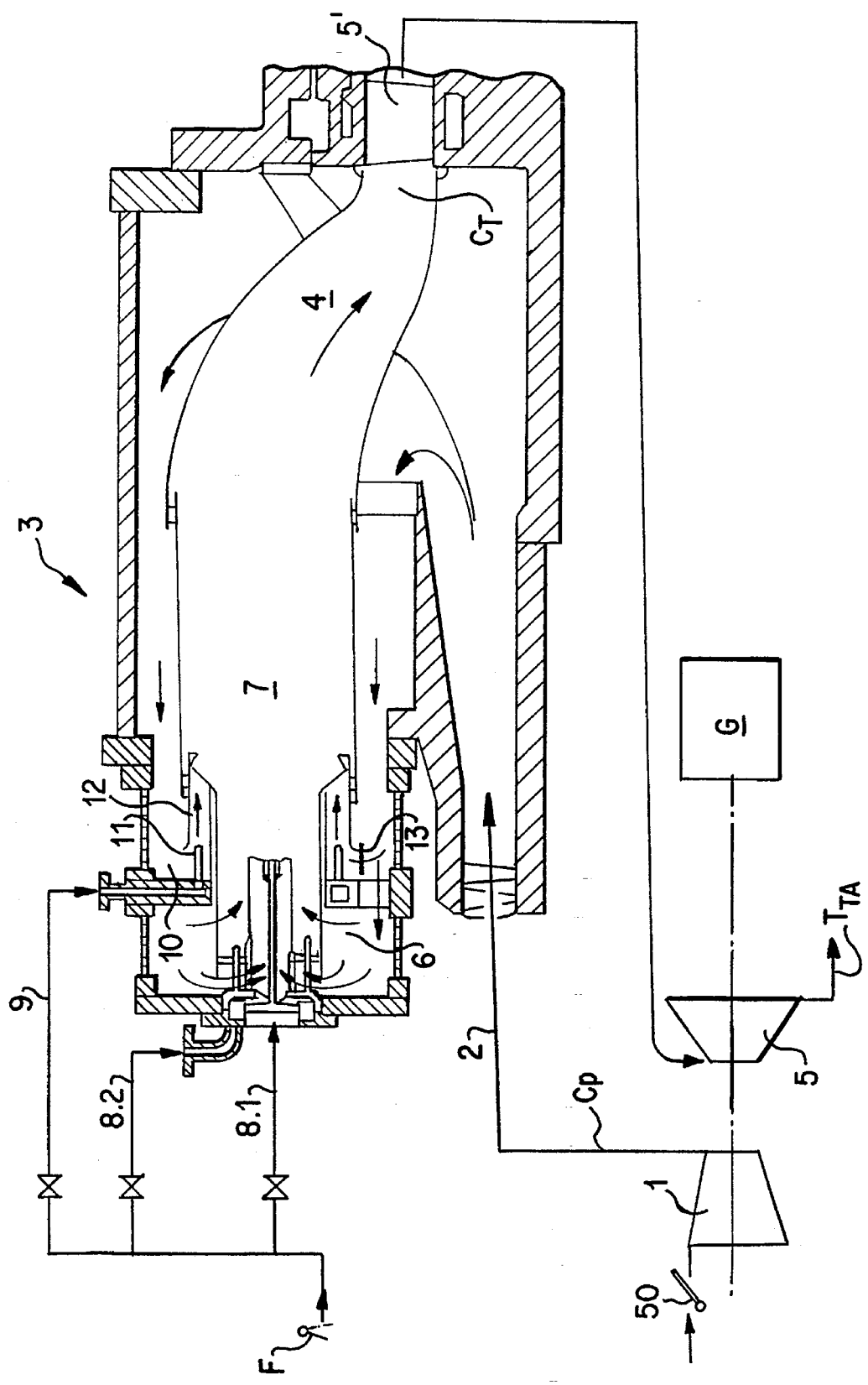
FIG. 1 is a schematic sectional illustration of a gas turbine and generator system of the type which is to be controlled by the control system and control method of the present invention.

Referring to FIG. 1, there is shown a sectional schematic view of a gas turbine system Which has a two-stage combustion type low $NO_x$ combustor employing a premixing chamber. Compressed air 2 flows from a schematically shown compressor 1 to a combustor 3, where it is combined with fuel and converted into combustion gas 4, which flows into and drives a gas turbine section 5 (also schematically shown together with the compressor 1). Inlet guide vanes 50 regulate the air flow rate being provided at the inlet of the compressor. The turbine section 5 drives an electric generator G. In use, the turbine runs at a substantially constant rotational speed and the generator G applies a variable load to the system.

$C_P$ designates the outlet pressure (Kg/Cm² gage pressure) of the compressor 1 and $T_{TA}$ (° C.) represents the actual exhaust temperature of the turbine section 5. These parameters $C_P$ and $T_{TA}$ will be referred to below in discussing the operation of the system according to the invention.

$C_T$ designates the combustion chamber temperature. Since this temperature $C_T$ is extremely high, in excess of 1000° C. during engine operating conditions (exemplary range of 1295°–1300° C. at rated full load operation), it is difficult to monitor directly. For this reason, the turbine exhaust temperature $T_{TA}$ is detected and used as a control temperature in preferred embodiments of the invention.

The combustor 3 includes a first stage combustion section 6 and a second stage combustion section 7. Fuel F is supplied to the three fuel lines 8.1, 8.2 and 9. Fuel supplied by line 8.1 is used for engine startup operation. Fuel line 8.2 opens into the first stage combustion section 6 and fuel line 9 opens into the second stage combustion section 7. The second stage combustion section 7 is of a premixing type where air 10 for combustion (supplied from the compressor 1) and the fuel from a fuel nozzle 11 are mixed in a premixing section 12. An air regulator 13 is provided for controlling the flow rate of the air 10 for combustion so as to obtain a predetermined ratio of fuel 9 to air 10.

The above-described engine and the fuel supply system is basically known, and therefore further details are dispensed with herein in order not to obscure the present invention. The fuel from line 8.1 is used for engine startup operations, and the fuel to the first combustion space 6 by way of line 8.2 and the fuel by way of line 9 to the second combustion space and premixing chamber provide the fuel for normal engine operations.

Figure 2:
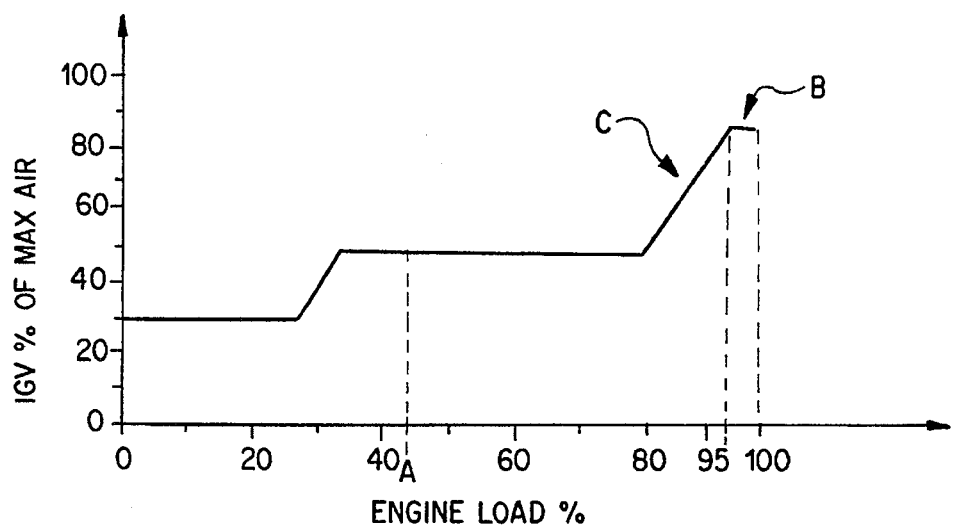
FIG. 2 is a graph generally schematically depicting the percentage of maximum air inlet supply through the compressor inlet guide vanes of the engine of FIG. 1, as a function of the engine operating conditions.

The supply of air by way of the compressor 1 and the controllable inlet guide vanes 50 is schematically depicted in FIG. 2 over the range of load operation of the turbine engine system. Referring to FIG. 2, the point A indicates the reaching of 100% engine operational rotational speed for the compressor/turbine unit 1, 5. From this FIG. 2, it can be seen that the inlet guide vanes are initially set at about 30% of fully open position for engine startup, and then gradually increased to 50% as the engine reaches its rated rotational speed. Section C of FIG. 2 schematically depicts control of the inlet guide vanes during decreasing load conditions (so-called IGV control) (discussed in detail below). Section B of FIG. 2 schematically depicts operation of the system at rated load conditions with the inlet guide vanes at their fully open positions with the engine control due to change in load (and resultant changes in turbine exhaust temperature $T_{TA}$) being done by way of changes in fuel supply only. Note that this schematic depiction of sections B and C of FIG. 2 is to provide a background for the following description of the engine control system by showing the general operating range that the invention is directed toward and is not intended to limit the preferred embodiment to the specific ranges depicted.

Figure 3:
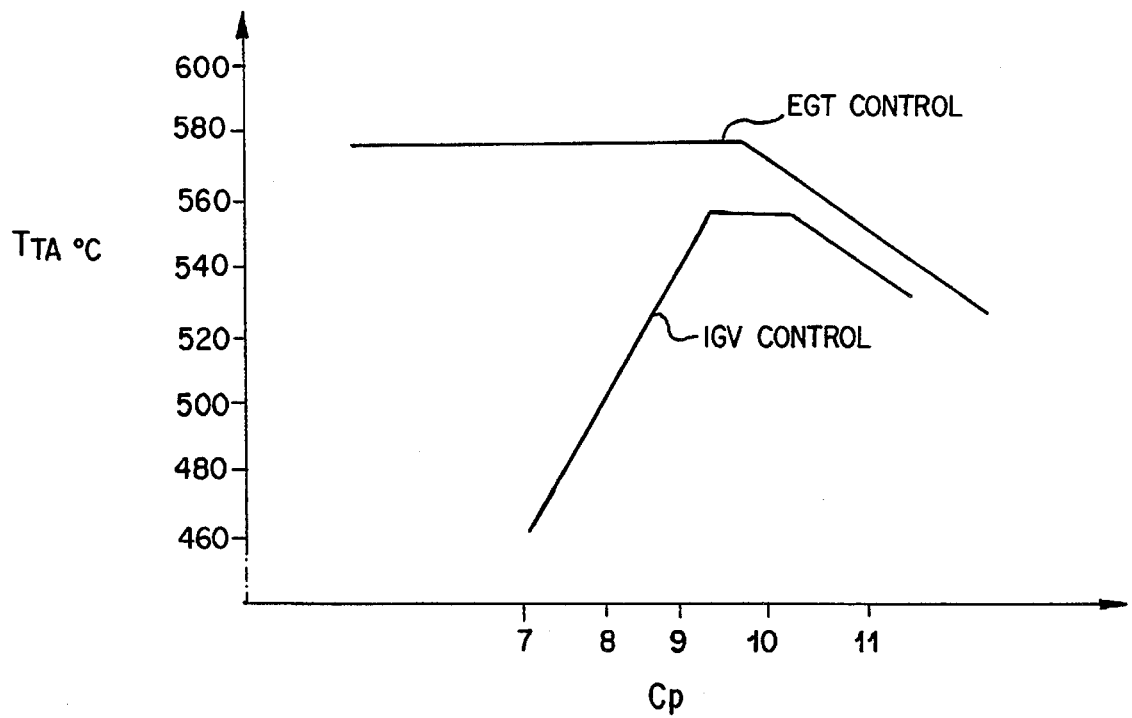
FIG. 3 is a graph showing turbine exhaust temperature as a function of compressor pressure, depicting the operation utilizing the control system and control method according to preferred embodiments of the present invention.

FIG. 3 is a graph showing the compressor pressure outlet pressure $C_P$ as a function of turbine exhaust temperature $T_{TA}$ for the system of FIG. 1, and schematically depicting the different control lines for EGT control and for IGV control.

Figure 4:
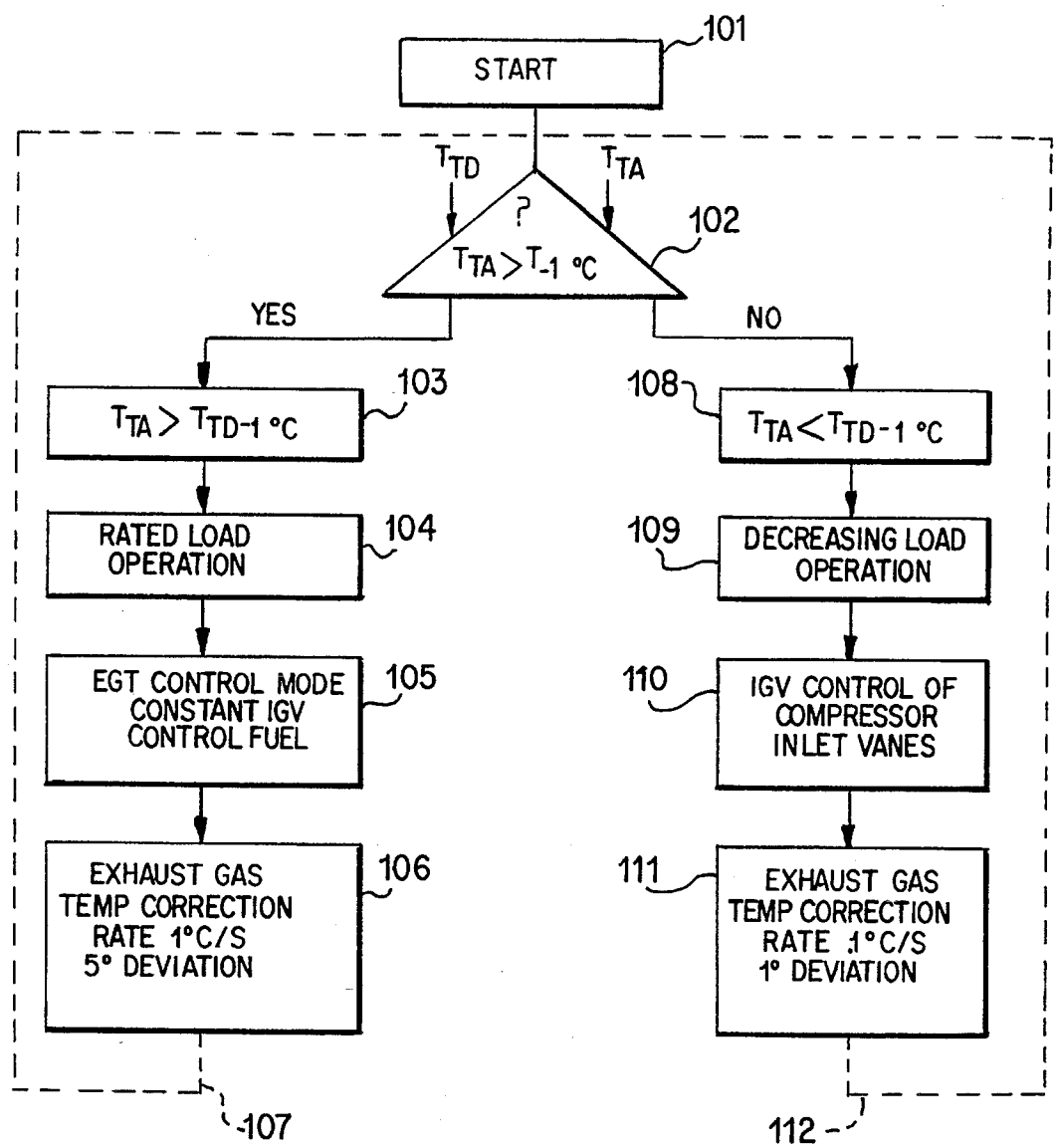
FIG. 4 is a process control diagram depicting the process of engine control according to a preferred embodiment of the present invention.

FIG. 4 is a control process flow chart depicting the process according to the present invention. Starting at Block 101 with the engine in an operational range corresponding to sections B and C of the curve shown in FIG. 2, the block 102 indicates a comparison of the actual turbine exhaust temperature $T_{TA}$ to a desired set value of turbine exhaust temperature $T_{TD}$. If $T_{TA}$ is greater than $T_{TD}-1°$ C. as indicated in block 103, the system is operated as indicated in its normal rated load operation mode block 104, namely under "exhaust gas temperature control" or EGT control (block 105) wherein only the fuel supply is controlled with fully opened inlet guide vanes. Block 106 indicates that this EGT control is accomplished at a temperature correction rate of 1° C./s and is triggered by 5° C. deviation of $T_{TA}$ from $T_{TD}$. In other words, if the actual temperature $T_{TA}$ is more than 5° greater than $T_{TD}$, then the system will be switched to the EGT control mode and adjustments will be made of the fuel supply at a predetermined rate of control corresponding to a 1° C. change in temperature $T_{TA}$ per second, for a 5 second integral, namely resulting in a 5° C. change over a 5 second time period. Line 107 indicates that the process is continuous and the temperature $T_{TA}$ will be continuously monitored.

In the event that, referring to block 102, $T_{TA}$ is less than $T_{TD}-1°$ C. (block 108), indicating a decreasing load condition as represented by block 109, then the system is switched to the inlet guide vane (IGV) control mode as represented by block 110. During IGV control, the air supply is controlled by controlling the inlet guide vanes 50. The degree and rate of control under the IGV control mode of operation is represented in block 111, wherein the guide vanes are adjusted to adjust (reduce) the air supply at a temperature correction rate of 0.1° C./s (one tenth of 1° C./second) with control being triggered by a 1° negative change in $T_{TA}$ relative to $T_{TD}$. This means that, when the temperature is 1° C. less than $T_{TD}$, the system is switched to IGV control and the guide vanes are adjusted at a rate of 0.1° C/s so that in the course of 5 seconds, a one-half degree temperature adjustment should be made. As with the operation under exhaust temperature control, the process is continuous, as represented by line 112, with the temperature being continuously monitored and switching of control from one mode of operation to the other being made based on the actual temperature detected as compared to the predetermined desired temperature represented in block 102.

With this system, which provides for a more precise fine temperature correction adjustment during decreasing load, the fuel-to-air mixture is maintained more precisely in its desired range than with prior arrangements.

Figure 5:
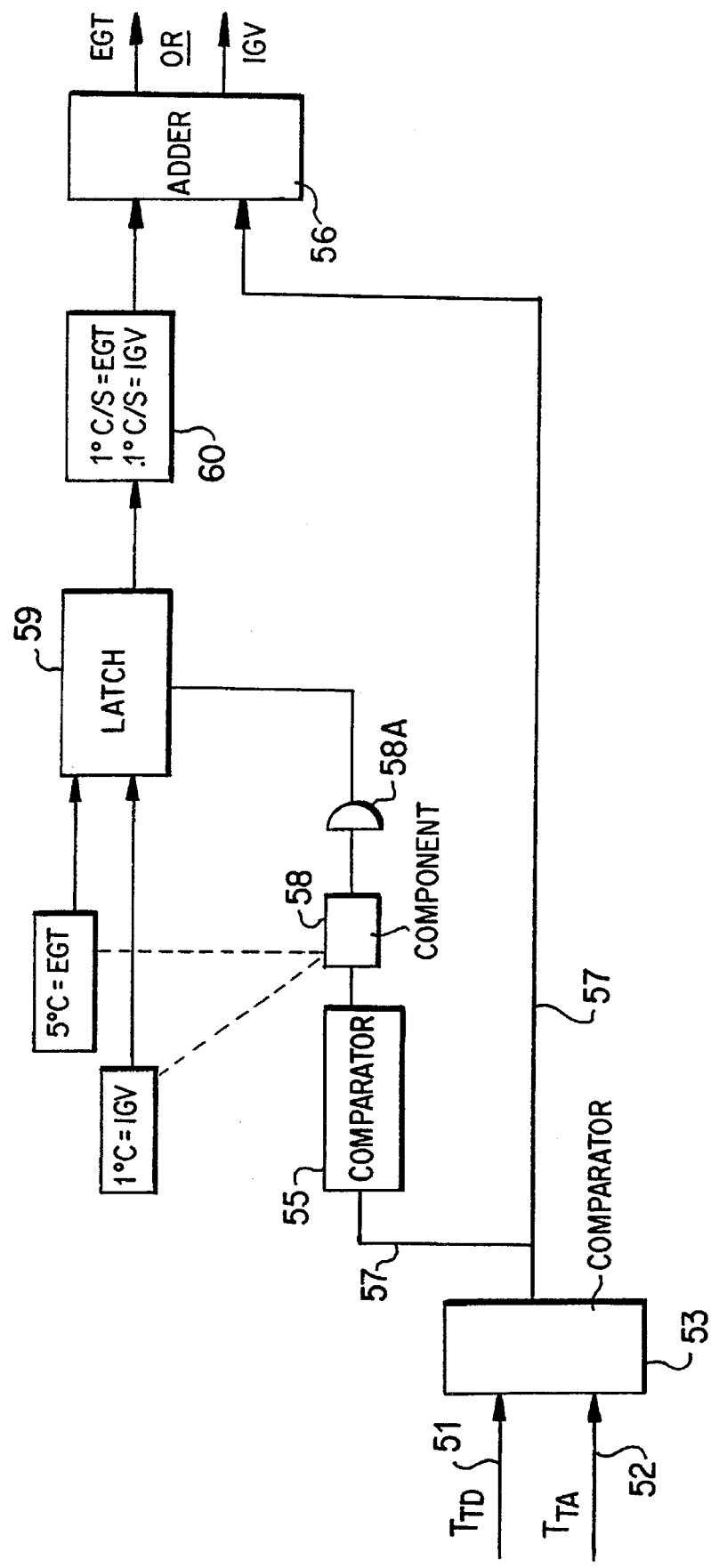
FIG. 5 is a schematic illustration of a control system for carrying out the process of controlling the gas turbine system according to FIG. 4.

FIG. 5 schematically depicts an electrical circuit for carrying out the process of the present invention as depicted in the process flow chart of FIG. 4. Electrical signal 51 is representative of temperature $T_{TD}$ and signal 52 is representative of temperature $T_{TA}$, said signals being fed to a comparator 53 for comparing these temperatures. The temperature difference determined by comparator 53 is fed as an output signal 57 to both a final adder 56 and to a comparator 55. Assuming that the system is currently operating under the exhaust gas temperature (EGT) control mode, when the signal 57 to comparator 55 indicates $T_{TA}$ less than $T_{TD}-1°$ C., a signal is sent by component 58 indicating a 1° C. correcting temperature setting, which 1° C. setting is supplied directly to the latch component 59 and also indirectly to latch component 59 by way of a 5 second delay timer 58A. Component 59 then sends a signal to the rate limiter 60, which in turn outputs a signal of either 0.1° C./s or 1° C./s to the final adder 56. Adder 56 then issues a control signal to (i) either control the inlet guide vanes at a rate corresponding to a temperature correction rate of 0.1° C./s (IGV control) or (ii) to control fuel supply at a rate corresponding to a temperature correction rate of 1° C./s (EGT control).

Since the turbine exhaust gas temperature is continuously monitored, the system will automatically operate to switch between the two modes of operation whenever the conditions for a change are determined by the temperature comparator 53. For example, in the event there is an increase in $T_{TA}$ by 5° C. or more above $T_{TD}$, the comparator 55 will issue a corresponding signal to activate component 58, which will in turn send a corresponding signal directly to the latching mechanism 59, as well as indirectly by way of the 5 second delay timer 58A, thereby triggering a switching of the rate limiter 60 to signal the final adder 56 to effect control utilizing the exhaust gas temperature control (EGT control) wherein only the fuel supply is changed with fully open inlet guide vanes, said change being effected at a rate corresponding to a 1.0° C./s until $T_{TD}$ has been achieved. Further turbine exhaust gas temperature changes will trigger changes in the mode of control (EGT or IGV).

Analysis by the inventors indicates that the control system of the invention substantially improves the fuel/air mixture during decreasing load operations. These analyses indicate an approximate 4% correction in the fuel-to-air mixture ratio in the correct direction, thereby enhancing the operation of the system during load reduction phases of operation. The improved operation is especially significant in adjusting to low temperature (winter) conditions where the air density has a tendency to further aggravate the tendency of prior art systems to not correct air flow sufficiently precisely during decreasing load operations.

With the method and system of the present invention, the combustion stability is improved, and stable combustion can be maintained while keeping low $NO_x$ combustion emissions throughout the year.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method of controlling a gas turbine engine system of the type having:

a combustion chamber, a controllable fuel supply system opening to the combustion chamber and a controllable combustion air supply system opening to the combustion chamber, said fuel supply system and combustion air supply system serving to provide a combustible fuel and air mixture to the combustion chamber, a turbine which is operably driven by exhaust gases from the combustion chamber, said turbine being drivingly connected to a load, such as an electrical generator or the like, a compressor drivingly connected to the turbine, said compressor forming part of the combustion air supply system, and controllable inlet guide compressor vanes for controlling the amount of air supplied to the compressor, said method comprising the steps of:

continuously monitoring the temperature of turbine exhaust gases to detect increasing or decreasing changes in the load driven by the turbine;

controlling at least one of the fuel supply system and the combustion air supply system so as to modify a temperature change rate for the turbine exhaust temperature to be different for increasing and decreasing loads.

2. A method according to claim 1, comprising: generating a signal $T_{TA}$ corresponding to the turbine exhaust temperature, continuously generating a signal $T_{TD}$ corresponding to a predetermined desired turbine exhaust temperature, and comparing the signals $T_{TA}$ and $T_{TD}$ and selecting one of first and second control modes for controlling the fuel/air mixture in the combustion chamber in dependence on the relative values of $T_{TA}$ and $T_{TD}$.

3. A method according to claim 2, wherein said first control mode is an exhaust gas temperature control mode where the compressor inlet vanes are maintained in a set position and the exhaust gas temperature is corrected toward the desired temperature $T_{TD}$ only by varying the fuel supply.

4. A method according to claim 3, wherein said second control mode is an inlet guide vane control mode where the exhaust gas temperature is corrected toward the desired temperature $T_{TD}$ by controlling compressor inlet guide vanes.

5. A method according to claim 4, wherein said exhaust gas temperature control mode is maintained for rated load operation of the system with the turbine exhaust gas temperature above a predetermined minimum value below the desired temperature $T_{TD}$, and wherein said inlet guide vane control is switched on during decreasing load conditions when said turbine exhaust gas temperature falls below the predetermined minimum value below the desired temperature $T_{TD}$.

6. A method according to claim 5, wherein in said exhaust gas temperature control mode, the fuel supply is controlled at a rate corresponding to a 1° C./s turbine exhaust gas temperature correction rate.

7. A method according to claim 6, wherein, in said inlet guide vane control mode, the compressor inlet guide vanes are controlled at a rate corresponding to a 0.1° C./s turbine exhaust gas temperature correction rate.

8. A method according to claim 7, wherein said predetermined minimum value below the desired temperature $T_{TD}$ is 1° C.

9. A method according to claim 6, wherein, in said exhaust gas temperature control mode, control of the fuel supply is initiated only in response to 5° C. deviations from the desired temperature $T_{TD}$.

10. A method according to claim 8, wherein, in said inlet guide vane control mode, control of the air supply by way of the guide vanes is initiated in response to a 1° deviation from the desired temperature $T_{TD}$.

11. A method controlling a gas turbine engine system of the type having:

a combustion chamber, a controllable fuel supply system opening to the combustion chamber and a controllable combustion air supply system opening to the combustion chamber, said fuel supply system and combustion air supply system serving to provide a combustible fuel and air mixture to the combustion chamber, a turbine which is operably driven by exhaust gases from the combustion chamber, said turbine being drivingly connected to a load, such as an electrical generator or the like, a compressor drivingly connected to the turbine, said compressor forming part of the combustion air supply system, and controllable inlet guide compressor vanes for controlling the amount of air supplied to the compressor.

said method comprising:

operating said system with a constant rotational velocity at the compressor and turbine to drive an electric generator, continuously generating a first electrical signal corresponding to a desired turbine exhaust temperature, continuously generating a second electrical signal corresponding to an actual detected turbine exhaust temperature, continuously comparing the first and second signals to generate an electric temperature difference signal representative of the difference between the desired and actual temperatures, and utilizing the temperature difference signal to select one of first and second control modes for controlling the fuel/air mixture in the combustion chamber in dependence on the relative values of the first and second signals, wherein said first control mode is an exhaust gas temperature control mode where the compressor inlet vanes are maintained in a set position and the exhaust gas temperature is corrected toward the desired temperature TTD Only by varying the fuel supply, wherein said second control mode is an inlet guide vane control mode where the exhaust gas temperature is corrected toward the desired temperature $T_{TD}$ by controlling the compressor inlet guide vanes, and wherein said exhaust gas temperature control mode is maintained for rated load operation of the system with the turbine exhaust gas temperature above a predetermined minimum value below the desired temperature $T_{TD}$, and wherein said inlet guide vane control mode is switched on during decreasing load conditions when said turbine exhaust gas temperature falls below the predetermined minimum value below the desired temperature $T_{TD}$.

12. A method according to claim 11, wherein, in said exhaust gas temperature control mode, the fuel supply is controlled at a rate corresponding to a 1° C./s turbine exhaust gas temperature correction rate.

13. A method according to claim 12, wherein, in said inlet guide vane control mode, the compressor inlet guide vanes are controlled at a rate corresponding to a 0.1° C./s turbine exhaust gas temperature correction rate.

14. A method according to claim 13, wherein said predetermined minimum value below the desired temperature $T_{TD}$ is 1° C.

15. A method according to claim 14, wherein, in said exhaust gas temperature control mode, control of the fuel supply is initiated only in response to 5° C. deviations from the desired temperature $T_{TD}$.

16. A method according to claim 15, wherein, in said inlet guide vane control mode, control of the air supply by way of the guide vanes is initiated in response to a 1° deviation from the desired temperature $T_{TD}$.

17. A control system for controlling a gas turbine engine system of the type having:

a combustion chamber having a pre-mixing combustor portion, a controllable fuel supply system opening to the pre-mixing combustor portion of the combustion chamber and a controllable combustion air supply system opening to the pre-mixing combustor portion of the combustion chamber, said fuel supply system and combustion air supply system serving to provide a combustible fuel and air mixture from the pre-mixing combustor portion to the combustion chamber, a turbine which is operably driven by exhaust gases from the combustion chamber, said turbine being drivingly connected to a load, such as an electrical generator or the like, a compressor drivingly connected to the turbine, said compressor forming part of the combustion air supply system, and controllable inlet guide compressor vanes for controlling the amount of air supplied to the compressor, said control system comprising:

means for continuously monitoring the temperature of turbine exhaust gases to detect increasing or decreasing changes in the load driven by the turbine; and means for controlling at least one of the fuel supply system and the combustion air supply system so as to modify a temperature change rate for the turbine exhaust temperature to be different for increasing and decreasing loads.

18. A method of controlling a gas turbine engine system of the type having:

a combustion chamber, a controllable fuel supply system opening to the combustion chamber and a controllable combustion air supply system opening to the combustion chamber, said fuel supply system and combustion air supply system serving to provide a combustible fuel and air mixture to the combustion chamber, a turbine which is operably driven by exhaust gases from the combustion chamber, said turbine being drivingly connected to a load, such as an electrical generator or the like, a compressor drivingly connected to the turbine, said compressor forming part of the combustion air supply system, and controllable compressor inlet guide vanes for controlling the amount of air supplied to the compressor.

said method comprising:

continuously generating a first signal corresponding to a desired turbine exhaust temperature, continuously generating a second signal corresponding to an actual detected turbine exhaust temperature, continuously comparing the first and second signals to generate a temperature difference signal representative of the difference between the desired and actual temperatures, and utilizing the temperature difference signal to select one of first and second control modes for controlling the fuel/air mixture in the combustion chamber in dependence on the relative values of the first and second signals, wherein the exhaust gas temperature is corrected toward the desired temperature at a first turbine exhaust temperature correction rate in said first control mode, wherein the exhaust gas temperature is corrected toward the desired temperature at a second turbine exhaust gas temperature correction rate in said second control mode, said first and second correction rates being different from one another.

19. A method according to claim 18, wherein said first control mode is maintained for rated load operation of the system with the turbine exhaust gas temperature above a predetermined minimum value below the desired temperature, and wherein said second control mode is switched on during decreasing load conditions when said turbine exhaust gas temperature falls below the predetermined minimum value below the desired temperature.

20. A method according to claim 19, wherein said first control mode is an exhaust gas temperature control mode where the compressor inlet guide vanes are maintained in a set position and the exhaust gas temperature is corrected toward the desired temperature only by varying the fuel supply.

21. A method according to claim 19, wherein said second control mode is an inlet guide vane control mode where the exhaust gas temperature is corrected toward the desired temperature by controlling the compressor inlet guide vanes.

22. A method according to claim 20, wherein said second control mode is an inlet guide vane control mode where the exhaust gas temperature is corrected toward the desired temperature by controlling the compressor inlet guide vanes.

23. A method according to claim 22, wherein, in said exhaust gas temperature control mode, the fuel supply is controlled at a rate corresponding to a 1° C./s turbine exhaust gas temperature correction rate.

24. A method according to claim 23, wherein, in said inlet guide vane control mode, the compressor inlet guide vanes are controlled at a rate corresponding to a 0.1° C/s turbine exhaust gas temperature correction rate.

25. A method according to claim 24, wherein said predetermined minimum value below the desired temperature is 1° C.

26. A method according to claim 25, wherein, in said exhaust gas temperature control mode, control of the fuel supply is initiated only in response to 5° C. deviations from the desired temperature.

27. A method according to claim 26, in said inlet guide vane control mode, control of the air supply by way of the guide vanes is initiated in response to a 1° deviation from the desired temperature.

28. A method according to claim 18, comprising operating said system with a substantially constant rotational velocity at the compressor and turbine to drive an electric generator.

29. A method according to claim 19, comprising operating said system with a substantially constant rotational velocity at the compressor and turbine to drive an electric generator.

30. A method according to claim 22, comprising operating said system with a substantially constant rotational velocity at the compressor and turbine to drive an electric generator.

31. A method according to claim 24, comprising operating said system with a substantially constant rotational velocity at the compressor and turbine to drive an electric generator.

32. A control system for controlling a gas turbine engine system of the type having:

a combustion chamber, a controllable fuel supply system opening to the combustion chamber and a controllable combustion air supply system opening to the combustion chamber, said fuel supply system and combustion air supply system serving to provide a combustible fuel and air mixture to the combustion chamber, a turbine which is operably driven by exhaust gases from the combustion chamber, said turbine being drivingly connected to a load, such as an electrical generator or the like, a compressor drivingly connected to the turbine, said compressor forming part of the combustion air supply system, controllable compressor inlet guide vanes for controlling the amount of air supplied to the compressor.

said control system comprising:

first signal generator for continuously generating a first signal corresponding to a desired turbine exhaust temperature, second signal generator for continuously generating a second signal corresponding to an actual detected turbine exhaust temperature, a comparator for continuously comparing the first and second signals to generate a temperature difference signal representative of the difference between the desired and actual temperatures, means for utilizing the temperature difference signal to select one of first and second control modes for controlling the fuel/air mixture in the combustion chamber in dependence on the relative values of the first and second signals, wherein the exhaust gas temperature is corrected toward the desired temperature at a first turbine exhaust temperature correction rate in said first control mode, and wherein the exhaust gas temperature is corrected toward the desired temperature at a second turbine exhaust gas temperature correction rate in said second control mode, said first and second correction rates being different from one another.

33. A control system according to claim 32, wherein said first control mode is maintained for rated load operation of the system with the turbine exhaust gas temperature above a predetermined minimum value below the desired temperature, and wherein said second control mode is switched on during decreasing load conditions when said turbine exhaust gas temperature falls below the predetermined minimum value below the desired temperature.

34. A control system according to claim 33, wherein said first control mode is an exhaust gas temperature control mode where the compressor inlet guide vanes are maintained in a set position and the exhaust gas temperature is corrected toward the desired temperature only by varying the fuel supply.

35. A control system according to claim 35, wherein said second control mode is an inlet guide vane control mode where the exhaust gas temperature is corrected toward the desired temperature by controlling the compressor inlet guide vanes.

36. A control system according to claim 34, wherein said second control mode is an inlet guide vane control mode where the exhaust gas temperature is corrected toward the desired temperature by controlling the compressor inlet guide vanes.

37. A control system according to claim 36, wherein, in said exhaust gas temperature control mode, the fuel supply is controlled at a rate corresponding to a 1° C./s turbine exhaust gas temperature correction rate.

38. A control system according to claim 37, wherein, in said inlet guide vane control mode, the compressor inlet guide vanes are controlled at a rate corresponding to a 0.1° C./s turbine exhaust gas temperature correction rate.

39. A control system according to claim 38, wherein said predetermined minimum value below the desired temperature is 1° C.

40. A control system according to claim 39, wherein, in said exhaust gas temperature control mode, control of the fuel supply is initiated only in response to 5° C. deviations from the desired temperature.

41. A control system according to claim 40, in said inlet guide vane control mode, control of the air supply by way of the guide vanes is initiated in response to a 1° deviation from the desired temperature.

42. A method of controlling a gas turbine engine system of the type having:

a combustion chamber, a controllable fuel supply system opening to the combustion chamber and a controllable combustion air supply system opening to the combustion chamber, said fuel supply system and combustion air supply system serving to provide a combustible fuel and air mixture to the combustion chamber., a turbine which is operably driven by exhaust gases from the combustion chamber, said turbine being drivingly connected to a load, such as an electrical generator or the like, a compressor drivingly connected to the turbine, said compressor forming part of the combustion air supply system, and controllable inlet guide compressor vanes for controlling the amount of air supplied to the compressor, said method comprising the steps of:

continuously monitoring the temperature of turbine exhaust gases to detect increasing or decreasing changes in the load driven by the turbine;

changing the turbine exhaust temperature at a first temperature correction rate by controlling the fuel supply system for increasing loads; and changing the turbine exhaust temperature at a second temperature correction rate, different from said first temperature correction rate, by controlling at least one of the combustion air supply system and fuel supply system for decreasing loads.

* * * * *